United States Patent
Schwaderer et al.

(10) Patent No.: US 12,153,409 B2
(45) Date of Patent: Nov. 26, 2024

(54) COMPUTER-IMPLEMENTED METHOD FOR DETERMINING DEFECTS OF AN OBJECT PRODUCED USING AN ADDITIVE MANUFACTURING PROCESS

(71) Applicant: Volume Graphics GmbH, Heidelberg (DE)

(72) Inventors: Gerd Schwaderer, Heidelberg (DE); Thomas Günther, Heidelberg (DE); Johannes Fieres, Heidelberg (DE); Matthias Flessner, Heidelberg (DE)

(73) Assignee: VOLUME GRAPHICS GMBH, Heidelberg (DE)

( * ) Notice: Subject to any disclaimer, the term of this patent is extended or adjusted under 35 U.S.C. 154(b) by 579 days.

(21) Appl. No.: 17/604,712

(22) PCT Filed: Apr. 16, 2020

(86) PCT No.: PCT/EP2020/060708
§ 371 (c)(1),
(2) Date: Oct. 18, 2021

(87) PCT Pub. No.: WO2020/212489
PCT Pub. Date: Oct. 22, 2020

(65) Prior Publication Data
US 2022/0197262 A1 Jun. 23, 2022

(30) Foreign Application Priority Data
Apr. 18, 2019 (DE) .................... 10 2019 110 360.6

(51) Int. Cl.
*G05B 19/418* (2006.01)
*G01N 23/18* (2018.01)
(Continued)

(52) U.S. Cl.
CPC ....... *G05B 19/41875* (2013.01); *G01N 23/18* (2013.01); *G05B 23/0254* (2013.01);
(Continued)

(58) Field of Classification Search
CPC ..... B29C 64/393; B29C 64/153; B33Y 50/02; B33Y 10/00; B33Y 30/00; B33Y 50/00;
(Continued)

(56) References Cited

U.S. PATENT DOCUMENTS 10,937,237 B1 * 3/2021 Kim .......................... G06T 7/75
11,037,282 B2 * 6/2021 Tong ...................... G06V 20/66
(Continued)

FOREIGN PATENT DOCUMENTS

WO  WO-2018052487 A1 * 3/2018 ............. B23K 26/34
WO  2018217903 A1   11/2018

OTHER PUBLICATIONS

Anton du Plessis et al., "Standard method for microCT-based additive manufacturing quality control 2: Density measurement", MethodsX, vol. 5, 2018, pp. 1117-1123, https://doi.org/10.1016/j.mex.2018.09.006 (Year: 2018).*
(Continued)

*Primary Examiner* — Manav Seth
(74) *Attorney, Agent, or Firm* — SoCal IP Law Group LLP; Angelo Gaz

(57) ABSTRACT

Described is determining defects of an object produced using an additive manufacturing process, including: determining spatially resolved first data relating to n objects, the first data defines a process coordinate system for each of the n objects, determining measurement data relating to the n objects by imaging the n objects, the measurement data defines, for each of the n objects, an object representation in a measurement coordinate system, determining which coordinates of at least one section of the measurement coordinate
(Continued)

system are defect coordinates assigned to a defect in the object representation; correlating the at least one section with a corresponding section of the process coordinate system in order to collect training data, training an adaptive algorithm for determining defect coordinates in spatially resolved data, by means of the training data, determining spatially resolved second data, and analysing the second data for defects by means of the adaptive algorithm.

15 Claims, 2 Drawing Sheets

(51) Int. Cl.
  *G05B 23/02* (2006.01)
  *G06T 7/00* (2017.01)
  *G01N 23/046* (2018.01)
(52) U.S. Cl.
  CPC ............ *G06T 7/001* (2013.01); *G01N 23/046* (2013.01); *G05B 2219/32189* (2013.01); *G06T 2207/20081* (2013.01); *G06T 2207/30164* (2013.01)
(58) Field of Classification Search
  CPC .......... B22F 10/85; B22F 10/00; B22F 10/80; B22F 10/30; B22F 12/90; G01N 23/18; G01N 23/046; G05B 2219/32222; G05B 19/41875; G05B 19/4099; G05B 23/0254; G05B 2219/32189; G05B 23/0243; G06T 2207/30164; G06T 7/0004; G06T 7/001; G06T 2207/20081
  See application file for complete search history.

(56) References Cited

U.S. PATENT DOCUMENTS

| 11,484,945 | B2* | 11/2022 | Sohn | B22F 10/25 |
| 2017/0032281 | A1 | 2/2017 | Hsu | |
| 2018/0095450 | A1* | 4/2018 | Lappas | G06F 30/20 |
| 2018/0104742 | A1 | 4/2018 | Kottilingam et al. | |
| 2018/0178287 | A1 | 6/2018 | Mamrak et al. | |
| 2018/0211373 | A1* | 7/2018 | Stoppa | G06T 7/55 |
| 2018/0322623 | A1* | 11/2018 | Memo | G06N 3/084 |
| 2022/0172330 | A1* | 6/2022 | Mason | B33Y 50/00 |
| 2022/0197246 | A1* | 6/2022 | Cella | G06T 7/70 |

OTHER PUBLICATIONS

Taehyun Rhee et al., "Scan-Based Volume Animation Driven by Locally Adaptive Articulated Registrations", IEEE Transactions on Visualization and Computer Graphics, vol. 17, No. 3, Mar. 2011, pp. 368-379 (Year: 2011).*
German Patent and Trademark Office, First Examination Report for German Application No. 10 2019 110 360.6, mail date Dec. 4, 2019, 5 pages.
European Patent Office/ISA, International Search Report and Written Opinion for PCT Application No. PCT/EP2020/060708, mail date Jul. 6, 2020.
Kévin Garanger et al, "Foundations of Intelligent Additive Manufacturing", Arxiv Preprint, May 12, 2017 (May 12, 2017), p. 1-9.
Purtonen Tuomas et al, "Monitoring and Adaptive Control of Laser Processes", Physics Procedia, Elsevier, Amsterdam, NL,vol. 56, Sep. 9, 2014 (Sep. 9, 2014), p. 1218-1231.
European Patent Office, Office Action for EP Application No. 20 719 624.7, mail date May 25, 2023.

* cited by examiner

COMPUTER-IMPLEMENTED METHOD FOR DETERMINING DEFECTS OF AN OBJECT PRODUCED USING AN ADDITIVE MANUFACTURING PROCESS

RELATED APPLICATION INFORMATION

This patent claims priority from International PCT Patent Application No. PCT/EP2020/060708, filed Apr. 16, 2020 entitled, "COMPUTER-IMPLEMENTED METHOD FOR DETERMINING DEFECTS OF AN OBJECT PRODUCED USING AN ADDITIVE MANUFACTURING PROCESS", which claims priority to German Patent Application No. DE 10 2019 110 360.6, filed Apr. 18, 2019 all of which are incorporated herein by reference in their entirety.

The invention relates to a computer-implemented method for the determination of defects of an object produced by means of an additive manufacturing process, wherein volume elements or spatial coordinates of the object to be produced are processed during the additive manufacturing process.

During the additive or generative production of an object, layer-by-layer construction of the object is usually carried out, for example on a substrate. A number of processes with which this is possible are known. These include inter alia the laser melting (selective laser melting, SLM) method, the electron beam melting (EBM) method, the selective laser sintering (SLS) method, the binder jetting method, the fused layering (fused deposition modeling, FDM) method and stereolithography.

In the laser melting method, a powder bed of fine metal particles with a planar surface is provided, for instance, and is melted at defined locations with the aid of a laser beam, after which it returns to the solid state. Binding to adjacent powder material in this case takes place. The laser may in this case travel along desired paths, which may be arbitrarily complex, on the surface. A layer of a desired object is formed on the regions scanned by the laser. This is followed by the application of a further powder layer and melting of the desired regions in this further powder layer. In this way, binding to the underlying layer is carried out. Thus, the object is successively constructed layer-by-layer with further additional powder layers.

In this process, for each layer the relevant regions that are to be melted are determined from information relating to the geometry to be manufactured, which for instance comes from a CAD model. Since this is done over a multiplicity of layers, it is thus carried out for coordinates in 3D (or in other words volume elements or voxels). After the last layer has been manufactured, the component may be removed from the powder bed. The unmelted powder and possible supporting structures are removed, after which the desired geometry is available, which may be used as a finished component or sent to further manufacturing steps (for example finishing the surface).

The manufacturing process of additive manufacturing is relatively complex. A very wide variety of parameters have a direct influence on the geometry of the component being manufactured, including for instance particle size, shape and surface properties of the powder used, layer thicknesses, power of the laser, spot diameter and path of the laser, preheating temperature of the powder bed, orientation of the geometry in the powder bed, supporting and auxiliary structures used (for example for geometrical stability and heat transport), and many others. The manufactured geometry therefore often does not correspond to the desired geometry of the aforementioned 3D coordinates at which the powder has nominally been melted. In particular, deformations of the overall geometry or local deviations of the surface may occur because of thermal effects. These effects, or deformations, may partially be simulated beforehand or determined by measuring the geometry of manufactured prototypes, this information in turn being usable to correct the manufacturing process. One possibility is to adapt the geometry of the coordinates or volume elements to be melted according to the deviations from the setpoint geometry, so that the deviations as far as possible no longer occur in the next construction process, or in the next iteration. Various defects may also occur inside the material, for instance pores, holes, structural loosening, porosities, cracks, delaminations or inclusions. These defects are usually undesired since they negatively influence the mechanical properties.

Against this background, the object of the present invention is to overcome the aforementioned disadvantages of the prior art and to provide an improved method for the determination of defects of an object.

Main features of the invention are specified herein.

The invention provides a computer-implemented method for the determination of defects of an object produced by means of an additive manufacturing process, wherein volume elements or spatial coordinates of the object to be produced are processed during the additive manufacturing process, wherein the method has the following steps: determining locally resolved first process data of n objects which are recorded during an additive manufacturing process for producing the n objects, the first process data defining a process data coordinate system for each of the n objects, determining measurement data of the n objects by nondestructive or destructive imaging methods after the production of the n objects, the measurement data defining an object representation in a measurement data coordinate system for each of the n objects, determining the coordinates of at least one subregion of the measurement data coordinate system which are defect coordinates, which are assigned to a defect in the object representation, correlating the at least one subregion of the measurement data coordinate system comprising the defect coordinates determined with a corresponding subregion of the process data coordinate system in order to collect training data, training an adaptive algorithm for the determination of defect coordinates in locally resolved process data, which have been recorded during an additive manufacturing process for producing an object, by means of the training data, determining locally resolved second process data which are recorded during an additive manufacturing process for producing an object, and analyzing the second process data in respect of defects by means of the adaptive algorithm.

In this way, a method which makes it possible to recognize potential defects of an object directly from the process data arising during the additive production is obtained. For this purpose, in a preparatory procedure, positions of defects in one or more objects are identified in measurement data of the objects. Positions may in this case be individual coordinates or clearly defined volume regions, or geometries. The measurement data may in this case be generated by conventional imaging methods and subsequent evaluation. The arising process data of the objects, which are examined by means of measurement data, are referred to here as first process data. The positions of the defects, which are defined by the defect coordinates, are correlated with the project data coordinate system of the first process data. Subsequently, the first process data with the correlated coordinates are saved as training data. By the training data, the adaptive algorithm is provided with the opportunity to learn, or recognize, characteristic features occurring in the first process data, which are associated with recognized defects or defect artefacts and on the other hand with defect-free regions, or material regions. Subsequently, the adaptive algorithm may already determine defects during the production of further objects in the process data arising during manufacturing. The process data of the further objects are referred to here as second process data.

In a first method step, according to the invention locally resolved first process data of n objects are thus determined, the first process data being recorded during an additive manufacturing process for producing the n objects, the first process data defining a process data coordinate system for each of the n objects.

Process data in the context of the invention are to be understood as data which may be directly acquired during the additive manufacturing process and which provide information relating to various quantities. Because of the successive material accumulation or material solidification along geometrically predetermined paths or layers following a known temporal profile, when carrying out regular or continuous recording, accompanying the production, the process data are already locally resolved per se. In particular, the process data could exist in a regular grid, for instance an array of individual volume elements (voxels) or be transformed into such an array. The process data may represent a very wide variety of physical properties, the type of process data depending in particular on the type of recording.

As process data may for instance have an optical measurement quantity. If a laser-based manufacturing method is used, for instance SLM or SLS, a camera or a photodiode could lie in a beam path of a laser and record light reflected back by the material. It could be expedient to examine each individual volume element illuminated with the laser and to detect the light power scattered back by the material. Suitable optics could ensure that no reflections of the laser, but only the emissions of the heated material, are measured. Such a measurement may be suitable since the optical properties of a material section can depend on its quality. If fluctuations of the back-scattered light power are detected in a region, for instance, this could be an indication that defects have occurred in this region.

Simultaneous optical recording of the entire layer during the construction procedure, for example by a camera, would likewise be conceivable. In addition, recording of laser-induced ultrasound could be carried out. As an alternative or in addition thereto, after manufacturing a layer of the object, the geometry of this layer may be measured, for instance by structured light projection, or an optical recording of the layer may be made. Further variants for carrying out accompanying measurements and recording process data may, however, also be envisioned. At this point, it should, however, be mentioned that it is not essential how precisely the processed data are acquired and which physical quantities are in this case recorded. It is, however, important for the method according to the invention that locally resolved process data are available.

It should in this case be noted that the process data initially exist in the setpoint geometry of the component to be manufactured, or the coordinates to be melted, since they are assigned to the respective instantaneous position in the manufacturing process. Deformations have not yet occurred at the instant when the individual measurement procedures are carried out. The first process data, or the process data in general, consequently do not exist in the exact actual geometry of the manufactured object.

In order to prepare for the training of the adaptive algorithm, the aforementioned training data are provided. For this purpose, the additive production of a particular number n of objects is initially carried out. The number n may in this case be selected according to requirements and may in particular be selected by the reliability and repeatability of the manufacturing method.

If a defect only occurs in exceptional cases at any location of an object, the number n may be selected to be correspondingly high so that a representative number of defects can be correlated with process data. If local defects are to be expected more often because of particularly high demands on the component quality, particularly fine structures and a particular material, the number n may also be selected to be lower. The aim is to produce a representative number n of objects which can be tested nondestructively or destructively in respect of defects by known methods.

A defect in the context of the invention is to be understood as a state in which the manufactured object does not have the desired property, which is actually intended for the object being produced, at a corresponding location. This may, for example, be a local deviation of an external geometry of a spatial section of the object being produced. One typical example of this could be a local deviation of the surface of the spatial section from the setpoint geometry. If the production method is based on the selective melting of material, for example, too much material could have been melted in the region of the surface of a section. In particular, this could include relatively small-scale deformations, for instance indentations or burr formation.

In a further example, the deviations may also be local deviations of an inner constitution of the spatial section. This may for instance relate to existing pores, holes, gas emissions, structural loosening, porosities, cracks, delaminations or inclusions of air, another gas, raw material or a vacuum.

The examination of the n objects in order to determine the measurement data may be carried out by various methods. In one particular embodiment, this may include the use of a computer tomograph. In principle, however, other processes may also be envisioned, for instance laminography/tomosynthesis, magnetic resonance tomography, radiography or stereoradiography, ultrasound/sonography, optical coherence tomography and lock-in thermography. For instance, the analysis of micrographs may be envisioned as a destructive method.

Furthermore, direct pixel-by-pixel or voxel-by-voxel identification of regions which are affected by defects is carried out in order to determine the positions of defects. The positions of the defects are represented by defect coordinates. Furthermore, determination of the edge lines between defects and material may be envisioned. In particular, an analysis of gray-value, gradient and shape properties may take place during the examination. The defect coordinates may thus have information relating to all volume elements of the object being produced which have defects, in which case defect attributes may be assigned to individual volume elements or groups of volume elements.

The findings from the examination of the n objects may be used effectively when they are correlated with the first process data which have arisen during the production of the n objects. The first process data may be very complex, and defects may be manifested differently therein as probably very small subsets. Irregularities in the first process data need not necessarily in fact correspond to a defect in the manufactured object, for instance since a defect occurring in one layer is eliminated by molten material of a layer lying above. A correlation of the defect coordinates and the first process data may thus be used to collect training data with which an adaptive algorithm can be trained. The adaptive algorithm may be usable to examine future (second) process data.

Adaptive algorithms are capable of recognizing or determining patterns or rules, which overall form a generalization, from a plurality of examples of a problem. Suitable adaptive algorithms may for example comprise artificial neural networks, deep learning, or machine learning in general, or template matching. It is likewise possible to use conventional image processing or pattern recognition algorithms in which particular setting parameters, which are for example optimized in such a way that they give the best possible results for the training data, are correspondingly adjustable.

Besides the algorithms mentioned above, methods such as support vector machine, random forest or a simple regression may also be used as adaptive algorithms. The training of the adaptive algorithm by means of the training data may be regarded as substantially completed when the adaptive algorithm, for example in a test run, reliably recognizes from the first process data whether or not there are defects in a region.

It should in this case be noted that the training data are respectively reusable for a particular configuration of the object to be produced under constant production conditions. If fundamental properties of the object or the production conditions are modified, new training data should be collected.

For the training, there could also be training data from another source of process data, for which suitable defect recognition is already possible. This information could then be used to train the defect recognition of the first process data.

In summary, the method according to the invention makes it possible to train an adaptive algorithm in order to carry out therewith nondestructive testing of additively produced objects in respect of possible defects during or after their production. Using the adaptive algorithm, it is possible to assess directly after manufacturing, or even during manufacturing, whether there are critical defects in the object.

According to one example of the invention, the step of analyzing the second process data in respect of defects by means of the adaptive algorithm may be carried out during the determination of the second process data. In this case, the second process data may already be analyzed by the adaptive algorithm during their determination during the manufacturing of the object by means of the additive manufacturing method. This has the effect that defects already generated at the start of the production of the object can be determined by means of the adaptive algorithm promptly during the further production. If the criticality of the defect so requires, this object may hence already be rejected during the production, i.e. the production may be terminated early. Time and material may hence be saved since objects in which critical defects are already established during the production may already be rejected in the incompletely produced state. On the basis of this information relating to the defects, it is furthermore conceivable to adapt the manufacturing parameters for the current or following manufacturing processes in such a way that further defects can be avoided or already existing defects can be repaired.

According to one example of the invention, during the production of the object, a physical measurement quantity for the locally resolved process data is recorded respectively for a volume element being processed during the production or for a spatial coordinate. This applies both to the first and to the second process data. The process data are consequently built up substantially continuously with the production of the object, and the determination of the first and second process data may thus respectively be integrated optimally into the production. As mentioned above, particularly in the case of laser-based manufacturing methods, the laser may be used for carrying out a desired measurement.

During the production of the object, at least two different physical measurement quantities for the locally resolved first and second process data may respectively be recorded for a volume element being processed during the production or for a spatial coordinate.

By the use of different measurement quantities, a measurement of a first measurement quantity may be reinforced by the measurement of a second measurement quantity. Sometimes, various defect types which are detectable particularly well with one of the measurement quantities but not with the other measurement quantities may occur. By the combined recording of the two measurement quantities, an improvement of the identification of the defects may be achieved. For example, a photodiode could be used in order to record laser beams reflected by molten material. In this way, for instance, a brightness may be determined, or the reflectance at least during a discrete instant. On the other hand, a camera which records a significantly greater amount of information, and provides at least one locally resolved gradation of brightnesses in a particular section of the object as process data, may also be used in parallel therewith. It is not necessary for the first and second process data to have the same type of measurement quantities. The measurement quantities of the first and second process data may differ. For instance, the first process data may for example be based on data of a photodiode and the second process data for example on data of a camera.

The locally resolved first and second process data may have information relating to the order in which volume elements or spatial coordinates are processed during the production. By means of this, time-dependent information as to whether for instance the production of one volume element influences the production of another volume element, or whether a defect in one material layer may be eliminated or is eliminated by a subsequent material layer, is thus available. The (first or second) process data may thus have tuples which have a plurality of data fields with a timestamp and measurement quantities. Furthermore, the data may be arranged in a spatial grid, each grid point having a data set with at least one measurement quantity.

In this context, it is also conceivable to store further global or locally resolved parameters in the process data as a direct data stream or in the form of metadata, for instance real and/or nominal values of a laser power, a size of a laser focal spot, a layer thickness, a temperature of the powder bed, properties of the powder used, a speed and track of the laser focal spot, or the like. In combination with the further process data, these parameters allow evaluation of directly dependent measurement quantities. This may for example relate to the brightness values recorded by photodiodes, which may directly depend on the laser power and/or the size of a laser focal spot.

Furthermore, the second process data may be examined in respect of deformations in the form of deviations of the surface configuration of at least one volume element from a setpoint geometry of the object as a defect. This may include particular measurement quantities which may extend beyond pure brightness information of a photodiode. The surface is in this case particularly the free surface which faces in the processing direction and is covered by a subsequent layer, if it is not an outer surface.

In the laser melting method or other methods, there is an at least single phase or state transition of the material during the production of the corresponding volume element. For instance, in the laser melting method a metal powder may be melted before returning to the solid state. An underlying fault or incompletely melted material could lead to a recess or bulge which impairs the surface of the relevant volume element. This defect in the form of a deformed surface could be recorded by image recording, including with the aid of a strip projection by a pattern projector, and incorporated into the second process data.

The second process data may furthermore be examined in respect of open or closed cavities with inclusion of raw material or fluid as a defect. Besides incomplete hardening of material, this could also relate to defective production of an overhang.

Particularly preferably, the examination of the n objects is carried out by a computed tomographic (CT) measurement. The latter is capable of recording even complex inner geometries, and measurement data which are highly informative in relation to geometrical deviations and material defects may be delivered. For the number of n objects, first process data may thus initially be determined in order to generate computed tomographic recordings after manufacturing the relevant object and to examine them in order to determine the measurement data. The locally resolved first process data are similar in their structure to the data of a computed tomographic recording, the effect of which is that these data can be correlated well with one another. Data of the CT recordings may be subjected to a conventional defect analysis, from which a defect mask may be derived for each of the n objects. This is to be understood as a representation which contains information relating to those regions in which defects are present in the component.

For example, further synthetic CT data may be generated from the process data. A prediction relating to the local X-ray absorption, or material density, is used in this case. These may subsequently be analyzed in relation to defects with conventional algorithms, or algorithms which are otherwise used for the analysis of CT data. The training data are in this case the gray values of the CT data themselves.

In this context, it should be mentioned that algorithms for the analysis of CT data could likewise be adaptive algorithms. One example of this would be an algorithm which segments the volume of the object into material or background, or defect and defect-free. Simulated measurements may be used for training an algorithm which, for instance, is based on field comparison.

The examination of the measurement data may have the substep: segmentation of defects in the measurement data determined in order to identify volume elements which have a defect. This provides locally resolved information relating to which volume elements describe the geometry of defects. For this purpose, individual volume elements which have a defect may be identified. The remaining volume elements may be marked as defect-free or regarded as defect-free by their lack of marking. Before the segmentation, it may be advantageous to remove artefacts which may customarily occur in CT data and would make analysis of the CT data difficult. The selected size of the individual volume elements of the CT data may be made dependent on the production method of the object. The segmentation could be generated with known analysis methods which are tried and tested for CT data. The training of the adaptive algorithm may be carried out by correlation of the segmented defect data with the first process data. From the second process data acquired subsequently, this information may be derived directly by means of the adaptive algorithm.

Furthermore, the segmentation of defects in the measurement data determined may be carried out into at least two defect classes, the at least two defect classes being linked with the corresponding correlated coordinates of the process data coordinate system in the correlation step. The adaptive algorithm is hence furthermore trained to recognize respectively different defect classes in the first and second process data. The at least two defect classes may have the various defect classes already mentioned above, which include inter alia pores, holes, structural loosening, porosities, cracks, delaminations, inclusions or deviations of the surface configuration. The inclusions may furthermore be differentiated into air-filled cavities, cavities filled with powder or other raw material or cavities filled with extraneous material. This may facilitate the decision for a user as to whether the object being produced is still usable.

During the segmentation, it may furthermore be advantageous for individual volume elements with information of the probability of an error that a defect exists to be provided. Instead of rather binary segmentation into defective or defect-free volume elements, this allows the adaptive algorithm a probability estimate of whether a volume element in question has a particular defect. From this, a type of probability map or matrix may be obtained. It is to be understood that the latter may also have probability information relating to the individual defect classes.

The measurement data could be prepared in analog fashion or manually. In this way, further information which is not visible in the pictorial information enters into the training of the adaptive algorithm. For example, individual defects which extend over a plurality of volume elements may be marked as critical or noncritical. The training then leads to each individual volume element not being evaluated per se, but to a prediction of larger regions of the process data being trained. Tolerance limits for critical defects may likewise be trained in this way.

Furthermore, before the correlation, the process data coordinates and the measurement data coordinate system may be registered for each of the n objects by means of an elastic multimodal registration. In this way, the measurement data and the first process data, which because of deformations occurring exist in two mutually independent coordinate systems, are transferred into the same structure, or a single coordinate system. Only then is a direct comparison between the recognized defects and the associated process data possible. In one preferred embodiment, the measurement data and the first process data are thus registered with one another before the correlation of the first process data and the defect coordinates. Methods for the registration are known from the prior art, in particular from the field of medical technology.

For the registration, in general, a model may be set up for describing the mapping from the imaging method for determining the first defect data. In this case, for example, checkpoints or sampling points may be defined and the deformation or mapping may be interpolated or extrapolated between them. The checkpoints may in this case lie in a regular or irregular array. The irregular array may for example have a higher resolution in relevant regions, for example in the vicinity of the surface, in the vicinity of defects, in regions with large deformation or in regions in which the mapping does not achieve a good approximation to the setpoint geometry. This reduces the total number of checkpoints and therefore reduces the calculation time required. According to a further example, in order to describe the mapping, normal rigid adaptations may be determined section-wise and optionally interpolated between these. Furthermore, in order to describe the mapping, for example an optionally position-dependent mapping may be analytically described globally and therefore for the entire three-dimensional space considered, for example with the aid of a Fourier series.

Furthermore, there are various possibilities for determining the mapping required in the case in question and therefore determining the parameters of the aforementioned model. An error measure and an optimizer may be used for this.

The error measure describes how well the setpoint geometry and the measurement data coincide. Points of reference of the same structures in the two data sets are required. These may respectively be, for example, the surface or surface structures such as corners and edges, but also defects in the interior which are manifested by variations of the gray values.

Other corresponding features may also be used, for example well-recognizable geometries, so-called landmarks, geometries or geometrical regions defined by an evaluation rule, or manually defined geometries or landmarks. In particular, distinctive geometries, for example surfaces or surface structures such as corners or edges, may be selected as landmarks. It would also be conceivable to use clearly recognizable defects or desired cavities or edges in the interior of the object to be produced.

In principle, this error measure may be defined with the aid of geometries and therefore interfaces between material and background or directly on the image data or gray values of the data sets. The two methods may also be combined.

The error measure may, for example, be a cross-correlation function between gray values of the process-data and defect-data images, or measurement data. Furthermore, a distance function based on the envelope of the component may for example be used as an error measure.

By means of transfer functions, a transformation of the first defect data into another coordinate system or another structure may be carried out. The transfer functions may be adapted by the optimizer, which is carried out on the basis of a merit function. During the calculation of the merit function, an error measure which is to be minimized by the optimizer may be determined for each calculation step. The adaptation may require a higher calculation power and/or calculation time with an increase of sampling points. For very simple defects and minor deformations, a rigid transformation may be sufficient. Global scaling may be a further degree of freedom of the mapping.

The optimizer may, for example, be started with a reduced number of landmarks for successively increasing the number of landmarks in an iterative process after a first approximation. For example, defects which are present both in the measurement data and in the first process data may be identified. Only these are then taken into account during a further elastic multimodal registration. This may accelerate or improve the convergence overall. By a regularization, overadaptation which occasionally occurs in adaptive algorithms may be avoided, so that convergence takes place even if particular landmarks are to be found only in one of the relevant data sets.

In a further example, before carrying out the the elastic multimodal registration of the first process data to the measurement data, the expected deformation of the object during the additive manufacturing can be taken into account. These predeformed first process data may be adapted more easily, or better, to the measurement data since they are already closer to this geometry. The deformation to be expected may in this case, for example, be determined with the aid of a simulation of the additive manufacturing process.

In a further example, the elastic multimodal registration may be determined exclusively with the aid of the surface data of the first process data and the measurement data, and correspondingly transferred to the inner regions.

In this case, a mechanical simulation of the deformation of the inner regions may also be carried out while taking into account the known deformation of the surface. The defect coordinates determined in the measurement data may hence be correlated by means of the elastic multimodal registration of the measurement data with the first process data, without defects having to be recognized in the first process data. The training data may hence be collected even without recognition of the defects in the process data. The determination of training data is hence independent of recognition of defects in the first process data.

In a further example, it is conceivable that exclusively data relating to individual defects are registered. Thus, from the overall picture of all volume elements of an object, for instance those regions which are regarded as having a defect can be filtered out. This may simplify the collection of training data. In this case, it would be necessary to take into account the fact that corresponding individual features which are to be interpreted as belonging to a defect may also occur only in a single data set. As already mentioned above, a defect could for instance be eliminated by the processing of subsequent layers so that it does not appear at all in the imaging examination.

In a further example, it is conceivable to carry out the analysis of the second process data in respect of defects in such a way that associated synthetic reference data (for example volume data of a computed tomographic measurement) are generated on the basis of the second process data and are thereupon analyzed in relation to defects with the aid of conventional algorithms.

In the description above, certain features and properties which are attributed to process data without the term "first" or "second" relate to both first and second process data, without explicitly mentioning this in each case.

The method according to the invention may be extended by additional functions, which may relate to information about the effects of defects that have been established from second process data. For example, an exact component geometry could possibly be derived from an analysis of the second process data while taking the defects into account. This opens up the possibility of checking geometrical quantities and tolerances such as dimension, shape and location, carrying out a strength calculation, a simulation of mechanical, thermal or electrical properties of the object. In this way, an estimate may be made of whether the object satisfies the properties required for its use.

The method may furthermore have the following steps: recording defect positions in the first process data, identifying defect pairs of defect coordinates in the measurement data and defect positions recorded in the first process data, which are assigned to one another with a probability above a predefined probability threshold value, registering the process data coordinate system and the measurement data coordinate system on the basis of the defect pairs identified. The defect positions may be coordinates of the process data coordinate system which define the positions of defects in the process data.

Exclusively defects, or defect pairs, which have been found with a particular certainty in the process data and measurement data are hence used. In this way, an effective registration which is based on the defect pairs between the first process data and the measurement data is provided. This improves the registration and leads to an improved correlation between the defect coordinates and the first process data even for the regions between the defect pairs. Improved training data, which lead to improved training of the adaptive algorithm, are thereby generated.

Furthermore, the method may have the step: repeating the steps of identification and registration, each repetition of the identification step being carried out on the basis of the registration carried out immediately before, the repetition of the identification and registration steps being carried out until a predefined termination condition is satisfied, the registration carried out last being used for the correlation after the termination.

By the improved registration in the preceding repetition, more defect pairs are hence identified in the current repetition since the improved registration correlates the defects in the first process data and the measurement data with one another better. By the improved recognition of defect pairs, more defect pairs, with which a further-improved registration may be calculated, are identified. An improved registration leads to an improved correlation of the defect coordinates with the first process data, so that the adaptive algorithm is trained with further-improved training data.

A termination condition may in this case be that the repeated identification substep does not identify any additional defect pairs in the first process data and the measurement data, which are assigned to one another with a probability above a predetermined probability threshold value, in comparison with the identification in the preceding run.

The method may furthermore have the step: repeating the steps: recording defect positions in the first process data, the recording of defect positions in the first process data being carried out at the latest starting with the first repetition by means of the adaptive algorithm, repeating the steps of identification and registration, each repetition of the identification step being carried out on the basis of the registration carried out immediately before, the repetition of the identification and registration steps being carried out until a predefined termination condition is satisfied, the registration carried out last being used for the correlation after the termination, correlating the at least one subregion of the measurement data coordinate system comprising the determined defect coordinates of the object representation with a corresponding subregion of the process data coordinate system in order to collect training data, training the adaptive algorithm in order to determine defect coordinates in locally resolved process data, which are recorded during an additive manufacturing process for producing an object, by means of the training data, the repetition of the steps of recording, repetition, correlation and training being carried out until a further predefined termination condition is satisfied.

By an improved registration, since improved training data are available, the adaptive algorithm may be trained better to the process data in respect of defect recognition. This may be used to identify more defect pairs in the first process data and the measurement data. Thus, the improvement of the registration may furthermore be used in order to further improve the training of the adaptive algorithm.

The further predefined termination condition may in this case occur when the adaptive algorithm records no new defect positions in the first process data in comparison with the preceding run.

The invention furthermore relates to a computer program product having instructions that can be executed on a computer and when executed on a computer cause the computer to carry out the method according to the description above.

Advantages and refinements of the computer program product correspond to the advantages and refinements of the method explained above. In this regard, reference is therefore made to the description given above.

Further features, details and advantages of the invention may be found from the following description of exemplary embodiments with the aid of the drawings, in which.

Figure 1:
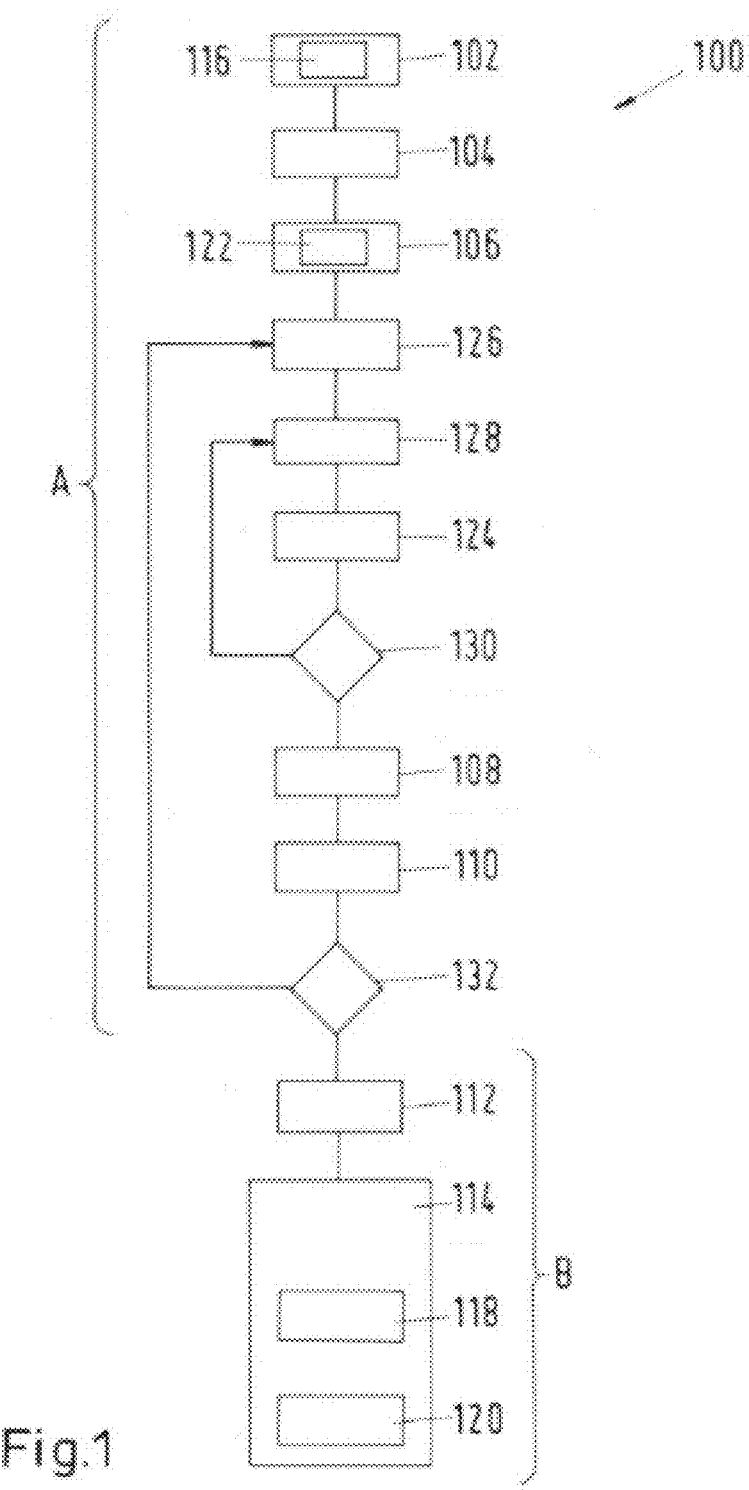
FIG. 1 shows a flowchart of a method according to the invention.

FIG. 1 shows a flowchart of a computer-implemented method 100 for the determination of defects of an object produced by means of an additive manufacturing process. The method 100 is essentially subdivided into two consecutive procedures. A preparatory first procedure A initially comprises the determination 102 of locally resolved first process data of n objects, which are recorded during an additive manufacturing process for producing the n objects. The step of determination 102 may thus also be a part of an additive manufacturing process of an object. The first process data define a process data coordinate system for each of the n objects.

Respectively for a volume element being processed during the production or a spatial coordinate, one or two (or more) physical measurement quantities may in this case be recorded 116 for the locally resolved process data.

The locally resolved first and second process data may in this case have information relating to the order in which volume elements or spatial coordinates are processed during the production.

Subsequently, after their production, the n objects are recorded in a further step by means of nondestructive or destructive imaging methods. In this case, measurement data of the n objects are determined 104. The measurement data define a measurement data coordinate system for each of the n objects. The determination 104 of the measurement data may be carried out by means of CT measurements.

An examination of at least one subregion of the measurement data is carried out. In this case, defect coordinates which are assigned to defects in the object representation are determined 106. The resulting measurement data from a CT measurement may optionally be segmented 122 into volume elements affected by a defect, in which case the defects may also be segmented into a plurality of defect classes.

In an optional further step, defect positions in the first process data are recorded 126. The defect positions may specify coordinates in the process data coordinate system which are assigned to defects of the object in the process data.

The recorded defect positions from the first process data and the determined defect coordinates from the measurement data may optionally be compared. In this case, in an optional further step, defect pairs of defect coordinates in the measurement data and recorded defect positions in the first process data, which are assigned to one another with a probability above a predefined probability threshold value, are identified 128. That is to say the defect pairs have defect positions in the first process data defects which with a high probability are to be found at a defect coordinate in the measurement data, and vice versa.

On the basis of the defect pairs identified, the process data coordinate system and the measurement data coordinate system may be registered 124. That is to say a mapping which maps the coordinates of the process data coordinate system and of the measurement data coordinate system onto one another is determined. The registration 124 may in this case be an elastic multimodal registration.

Figure 2:
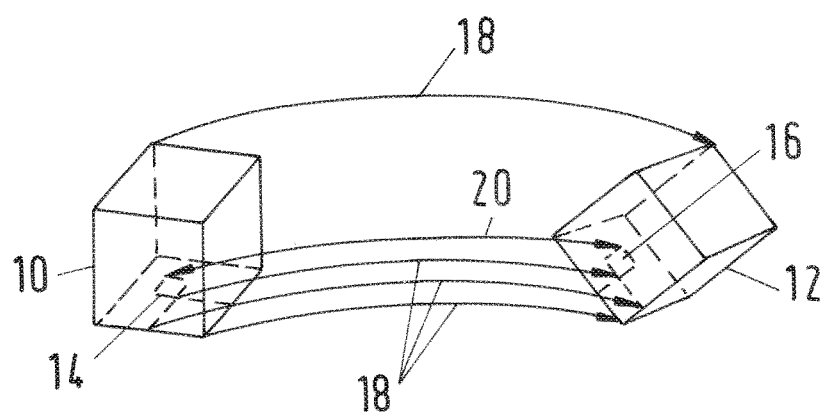
FIG. 2 shows a schematic representation of the correlation of defect coordinates with the process data coordinate system.

To explain the registration 124, FIG. 2 shows a visualization 10 of process data of an object and a visualization 12 of measurement data of an object, which was produced by means of an additive manufacturing method.

The object has a defect, which is denoted by the reference number 14 in the visualization 10 and by the reference 16 in the visualization 12. The visualizations 10, 12 have different coordinate systems, the visualization 10 having a process data coordinate system and the visualization 12 having a measurement data coordinate system.

The arrows 18 represent a registration by means of a mapping which maps various coordinates of the process data coordinate system onto the corresponding coordinates of the measurement data coordinate system. Inverse mapping, which maps the coordinates of the measurement data coordinate system onto the process data coordinate system, may also be provided in this case.

The defect 14 and the defect 16, which represent the same defect in the object in the process data and the measurement data, may be identified 128 as a defect pair 20.

The steps of identification 128 and registration 124 may according to FIG. 1 be repeated 130 in an optional exemplary embodiment. The repetition 130 leads to an iterative improvement of the registration 124, since the process data coordinate system and the measurement data coordinate system are aligned with one another by means of the registration 124. In this case, defects in the first process data and the measurement data, which have not yet been identified as defect pairs, may be linked with one another by the mapping of the registration so that they are recognized as a new defect pair during the subsequent repeated identification 128. This increases the number of identified defect pairs in each repetition 130. The increased number of defect pairs leads to an improvement of the registration 124.

The repetition 130 may be carried out until a predefined termination condition is satisfied. The predefined termination criterion may in this case be satisfied when the repeated substep of identification 128 does not identify any additional defect pairs in the first process data and the measurement data in comparison with the identification 128 in the preceding run. That is to say the repetition of the steps leads to no further improvement in the registration.

The determined defect coordinates from the measurement data are correlated 108 with coordinates of the process data coordinate system in a further step. That is to say, the defects from the measurement data are compared with the defects from the first process data and put into relation to one another. Training data are therefore collected by means of the correlated first process data. Furthermore, defect-free regions of the measurement data may also be correlated with the corresponding defect-free regions of the first process data. The correlation of the defect-free regions may also contribute to the training data.

If defect classes are taken into account in the segmentation 122, these defect classes may be linked with the corresponding correlated coordinates of the process data coordinate system during the correlation 108. The defect classes are then likewise part of the training data and may also be used subsequently during the analysis of the second process data with the trained adaptive algorithm.

In a further step, the training 110 of the adaptive algorithm is carried out. In this case, the adaptive algorithm is trained by means of training data to recognize the defects in the first process data and to determine the coordinates of the defects in the first process data.

An optional further step, in which the steps of recording 126, repetition 130, correlation 108 and training 110 are repeated 132, may be carried out. In this case, the defect positions in the first process data are initially recorded 126, the recording 126 of defect positions in the first process data being carried out by means of the trained adaptive algorithm. The trained adaptive algorithm in this case recognizes with a high probability, and with a tendency to higher accuracy, more defect positions in the first process data than were recorded during the initial recording 126 or a further preceding recording 126, since the registration 124 has been improved by the repetitions 130. This leads with a high probability to an increase in the number of defect pairs identified. The registration 124 is thereby improved further by a new repetition 130 so that further-improved training data, with which the adaptive algorithm receives improved training, can be collected. With the improved training, the adaptive algorithm may then record 126 even more defect positions in the first process data in a further repetition 132.

The repetition 132 may be carried out until a further predefined termination condition is satisfied. The further predefined termination condition may be satisfied when, for example, the adaptive algorithm does not record any new defect positions in the first process data in comparison with the preceding run. It may then be assumed that either no or only very little optimization potential can be added by further repetitions 132.

The preparatory procedure A is thus ended. After the preparatory procedure A, the procedure B in which potential defects can be recognized without an imaging analysis method by means of the trained adaptive algorithm may be carried out. For this purpose, locally resolved second process data, which are recorded during an additive manufacturing process for producing an object, are determined 112. Subsequently or in parallel therewith, the second process data are analyzed 114 in respect of possible defects by section-wise examination of the second process data in respect of defects by means of the trained adaptive algorithm. It is to be understood that procedure B may be repeated for arbitrary further objects which are produced by means of the additive manufacturing process.

The analysis 114 may for instance involve examination 118 of the second process data in respect of deformations in the form of deviations of the surface configuration, in the form of a setpoint geometry of the object, of at least one volume element as a defect. Furthermore, the examination 120 of the second process data may also be carried out in respect of open or closed cavities with inclusion of raw material or fluid as a defect.

The invention is not restricted to one of the embodiments described above, but may be modified in a variety of ways.

All of the features and advantages disclosed by the description and the drawing, including design details, spatial arrangements and method steps, may be essential to the invention both per se and in a very wide variety of combinations.

The invention claimed is:

1. A computer-implemented method for the determination of defects of an object produced by means of an additive manufacturing process, wherein volume elements or spatial coordinates of the object to be produced are processed during the additive manufacturing process, wherein the method comprises:
- determining locally resolved first process data of n objects which are recorded during a first additive manufacturing process for producing the n objects, the first process data defining a process data coordinate system for each of the n objects,
- determining measurement data of the n objects by non-destructive or destructive imaging methods after the production of the n objects, the measurement data defining an object representation in a measurement data coordinate system for each of the n objects,
- determining the coordinates of at least one subregion of the measurement data coordinate system which are defect coordinates, which are assigned to a defect in the object representation;
- correlating the at least one subregion of the measurement data coordinate system comprising the defect coordinates determined with a corresponding subregion of the process data coordinate system in order to collect training data,
- training an adaptive algorithm for the determination of defect coordinates in locally resolved process data, which have been recorded during a training additive manufacturing process for producing an object, by means of the training data,
- determining locally resolved second process data which are recorded during a second additive manufacturing process for producing an object, and
- analyzing the second process data in respect of defects by means of the adaptive algorithm, wherein the adaptive algorithm is an artificial neural network.

2. The method of claim 1, wherein analyzing the second process data in respect of defects by means of the adaptive algorithm is carried out during the determination of the second process data.

3. The method of claim 1, wherein during the production of the object, at least two different physical measurement quantities for the locally resolved first and second process data are respectively recorded for a volume element being processed during the production or for a spatial coordinate.

4. The method of claim 1, wherein the locally resolved first and second process data have information relating to the order in which volume elements or spatial coordinates are processed during the production.

5. The method of claim 1, wherein the second process data are examined in respect of deformations in the form of deviations of the surface configuration of at least one volume element from a setpoint geometry of the object as a defect.

6. The method of claim 1, wherein the second process data are examined in respect of open or closed cavities with inclusion of raw material or fluid as a defect.

7. The method of claim 1, wherein the determination of measurement data of the n objects is carried out by a computed tomography (CT) measurement.

8. The method of claim 7, wherein the examination of the measurement data further comprises: segmentation of defects in the measurement data determined in order to identify volume elements which have a defect.

9. The method of claim 8, wherein the segmentation of defects in the measurement data determined is carried out into at least two defect classes, the at least two defect classes being linked with the corresponding correlated coordinates of the process data coordinate system during correlating the at least one subregion of the measurement data coordinate system comprising the defect coordinates determined with a corresponding subregion of the process data coordinate system.

10. The method of claim 9, wherein the at least two defect classes have the defect classes of pores and/or inclusions of extraneous material.

11. The method of claim 1, wherein before the correlation, the process data coordinate system and the measurement data coordinate system are registered for each of the n objects by means of an elastic multimodal registration.

12. The method of claim 10, further comprising:
- recording defect positions in the first process data,
- identifying defect pairs of defect coordinates in the measurement data and recorded defect positions in the first process data, which are assigned to one another with a probability above a predefined probability threshold value, and registering the process data coordinate system and the measurement data coordinate system on the basis of the defect pairs identified.

13. The method of claim 12, further comprising repetition of the steps of identification and registration, each repetition of the identification step being carried out on the basis of the registration carried out immediately before, the repetition of the identification and registration steps being carried out until a predefined termination condition is satisfied, the registration carried out last being used for the correlation after the termination.

14. The method of claim 13, further comprising repetition of:
- recording defect positions in the first process data, the recording of defect positions in the first process data being carried out at the latest starting with the first repetition by means of the adaptive algorithm,
- repeating the steps of identification and registration, each repetition of the identification step being carried out on the basis of the registration carried out immediately before, the repetition of the identification and registration steps being carried out until a predefined termination condition is satisfied, the registration carried out last being used for the correlation after the termination,
- correlating the at least one subregion of the measurement data coordinate system comprising the determined defect coordinates of the object representation with a corresponding subregion of the process data coordinate system in order to collect training data,
- training the adaptive algorithm in order to determine defects coordinates in locally resolved process data, which are recorded during the training additive manufacturing process for producing an object, by means of the training data, the repetition of recording, repeating the steps of identification and registration, each repetition of the identification step being carried out on the basis of the registration carried out immediately before, the repetition of the identification and registration steps being carried out until a predefined termination condition is satisfied, the registration carried out last being used for the correlation after the termination, correlation and training being carried out until a further predefined termination condition is satisfied.

15. A non-transitory computer program product having instructions that can be executed on a computer and when executed on a computer cause the computer to carry out the method of claim 1.

* * * * *